United States Patent [19]

Perkins et al.

[11] 4,062,057

[45] Dec. 6, 1977

[54] REGULATED POWER SUPPLY HAVING A SERIES ARRANGEMENT OF INVERTERS

[75] Inventors: Donald W. Perkins, Dewitt, N.Y.; Marvin W. Smith, Roanoke, Va.

[73] Assignee: The United States of America as represented by the Secretary of the Navy, Washington, D.C.

[21] Appl. No.: 788,103

[22] Filed: Apr. 15, 1977

[51] Int. Cl.² .......................................... H02M 3/335
[52] U.S. Cl. ...................................... 363/71; 307/82; 363/25
[58] Field of Search ...................... 307/82; 321/11, 14, 321/27 R; 363/24, 25, 65, 71

[56] References Cited

U.S. PATENT DOCUMENTS 3,818,307  6/1974  Hamilton et al. ...................... 321/11

*Primary Examiner*—William M. Shoop
*Attorney, Agent, or Firm*—R. S. Sciascia; L. I. Shrago

[57] ABSTRACT

A regulated power supply which may be of the A.C.-to-D.C. type utilizes a series arrangement of inverters because of a voltage rating of these inverters with respect to the magnitude of the D.C. driving voltage available either as a consequence of rectifying an A.C. voltage source or other reasons. The regulator has a self-balancing feature which insures that all of the inverters equally share the D.C. driving voltage and also includes a protection feature which safeguards the inverters against damage caused by a malfunction of any one of the units.

4 Claims, 3 Drawing Figures

REGULATED POWER SUPPLY HAVING A SERIES ARRANGEMENT OF INVERTERS

The present invention relates generally to power supplies which utilize inverters in their operation and, more particularly, to an A.C.-to-D.C. regulated power supply or a static frequency converter wherein a plurality of inverters operate so as to equally share the input voltage.

It is not uncommon for the D.C. voltage as developed, for example, by rectifying the standard three-phase A.C. voltage available at the power lines to be too high to operate an inverter required to produce a comparatively low D.C. voltage. If the inverter if of the solid state type, a D.C. voltage, which may be twice the rectified line voltage, may occur across its switching elements, causing premature breakdown and failure.

One arrangement for avoiding this problem involves connecting two or more lower voltage inverters in series across the rectified D.C. voltage with their outputs driving a common load. However, with more than one inverter present, there is the possibility of an unbalanced sharing of the input voltage and/or load. Also, one of the inverters may malfunction presenting either, for example, a short-circuit or an open-circuit to the input supply voltage. Either of these conditions may result in fatal damage to the companion inverters of the series arrangement.

It is, accordingly, an object of the present invention to provide a regulated power supply utilizing a plurality of inverters which are serially interconnected across a D.C. driving voltage.

Another object of the present invention is to provide a regulated power supply employing a multiplicity of inverters that are inherently self-balancing so as to equally share the input driving voltage.

Another object of the present invention is to provide a power supply having at least two inverters with a single error amplifier controlling both units.

Briefly, and in general terms, the above objects of invention are realized by employing in the regulated power supply an appropriate number of low voltage inverters which are connected in series across the comparatively high D.C. Driving voltage. An R.C. network consisting of a series of resistors and a like series of capacitors are connected in parallel across this voltage with each capacitor in the input circuit of an associated inverter. One resistor and one capacitor is provided for each inverter. Each pair of adjacent resistors and capacitors functions like a bridge circuit to detect any irregularity in the performance of an inverter. Any irregularity in load sharing changes the equal voltage distribution normally existing across the chain of capacitors, and this results in a rebalancing of the system. Any substantial change in the input impedance of an inverter reflecting, for example, a short-circuit or an open-circuit in a unit also disturbs this voltage distribution. When this occurs, an unbalanced current flows between the R.C. junctions, and in response thereto, the D.C. driving voltage is removed from the inverters as a protection feature.

Other objects, advantages and novel features of the invention will become apparent from the following detailed description of the invention when considered in conjunction with the accompanying drawings wherein.

Figure 1:
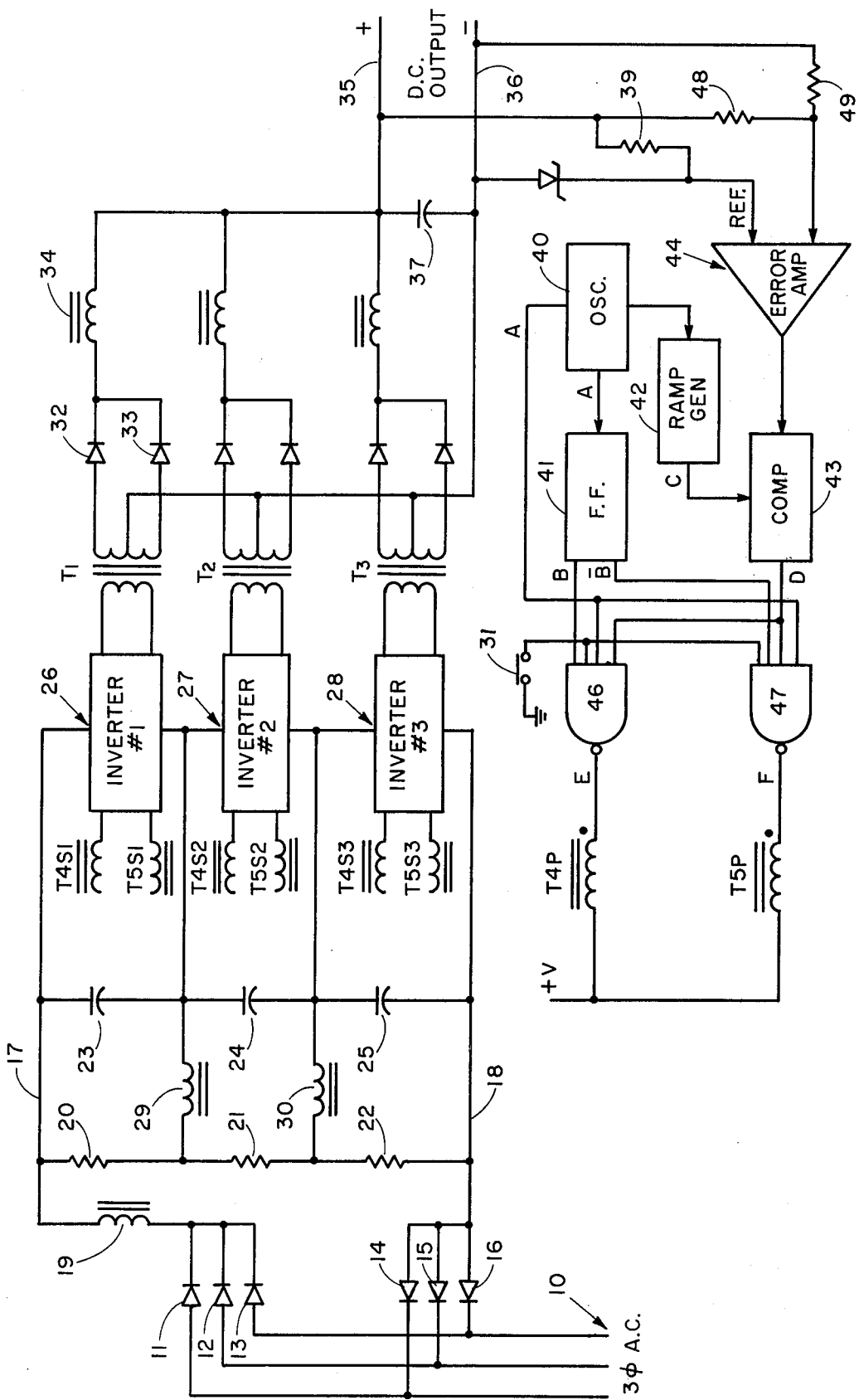
FIG. 1 is a schematic diagram of an A.C.-to-D.C. regulated power supply embodying the principles of the invention.

Referring now to FIG. 1 of the drawings which shows an A.C.-to-D.C. regulated power supply embodying the present invention, a three-phase A.C. power source 10 has connected to its individual lines in a conventional configuration, a first series of rectifiers 11, 12 and 13 and a second series 14, 15 and 16 which fully rectify the A.C. voltages and provide a D.C. voltage across terminals 17 and 18. The ripple in this voltage is reduced by a filter choke 19 in the positive line. Thus, a substantially constant D.C. driving voltage is availble for the series arrangement of inverters 26, 27 and 28. In this illustrative embodiment, three inverters are shown. However, the specific number needed in any power supply is determined by the magnitude of the voltage across terminals 17 and 18 and the voltage rating of each inverter unit. In the present case, the driving voltage at each inverter is one-third the value of the rectified line voltage because of the voltage dividing action of equal magnitude input impedances of the three inverters 26, 27 and 28 which are connected in series across the above terminals.

In order to protect the inverters against damage caused by, for example, either excess driving voltage or short-circuit currents, the regulator includes a series arrangement of equal capacitors 23, 24 and 25 which is connected in parallel across the voltage divider. There is one capacitor for each inverter, with each capacitor being in the input circuit of an associated inverter.

A current detecting device, such as the energizing element of a solid state relay or the coil of a conventional relay is connected between the corresponding junctions of the resistors 20, 21 and 22 and the capacitors 23, 24 and 25. These detectors, here 29 and 30, respond to any unbalanced current flowing between the junctions and operate appropriate switches, such as 31, or other circuit interrupting means to isolate the inverters from their driving voltages.

In the normal operation of this portion of the system, with all of the inverters operating in their proper manner feeding the same or equal loads, the average current through each inverter is equal because of their series relationship. Each inverter exhibits substantially the same input impedance, and, as a consequence, capacitors 23, 24 and 25 are charged to the same voltage. This equality persists as long as conditions remain normal. Since the same voltage is present at opposite sides of detectors 29 and 30, no current flows through these coils. As a consequence, switch 31 in the control circuit of gates 46 and 47 remains open, a condition which permits normal operation of the power supply.

Figure 2:
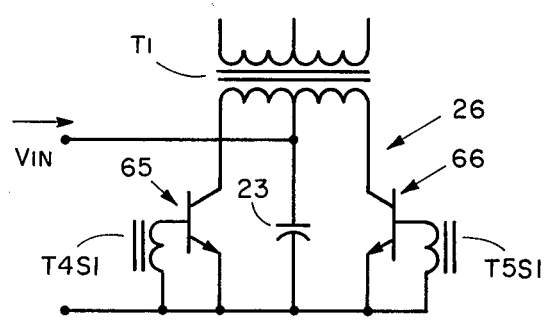
FIG. 2 is a circuit diagram of an inverter which may be used in the system of FIG. 1.

An inverter capable of performing as one of the units, such as 26 in the system of FIG. 1, is shown in detail in FIG. 2. Here a pair of N.P.N transistors 65 and 66, which operate in a push-pull manner, have their collectors connected to opposite ends of the primary winding of a transformer T1. Capacitor 23, which is part of the series arrangement shown in FIG. 1, is connected between a center tap of this primary and the emitters of both transistors which are interconnected. One secondary T4S1 of a transformer T4 is connected across the base-emitter terminals of transistor 66 while a similar secondary winding T5S1 of a second transformer T5 is likewise connected between the base-emitter terminals of transistor 65. As will be seen hereinafter, the primary windings of these transformers T4P and T5P are alternately energized for equal self-adjustable time intervals to render transistors 65 and 66 sequentially conductive. The A.C. signal produced as a consequence of this push-pull mode of operation energizes the primary winding of transformer T1, and the secondary voltage thus generated is rectified in a conventional manner by rectifiers 32 and 33. A filter choke 34 is included in the positive line to smooth out any ripple in this rectified voltage.

All of the inverters are of similar construction, and in the arrangement of FIG. 1, the A.C. voltages they generate are combined after rectification to provide a D.C. output across terminals 35 and 36. A filter capacitor 37 may be included at the output to further improve the D.C. waveform.

Figure 3:
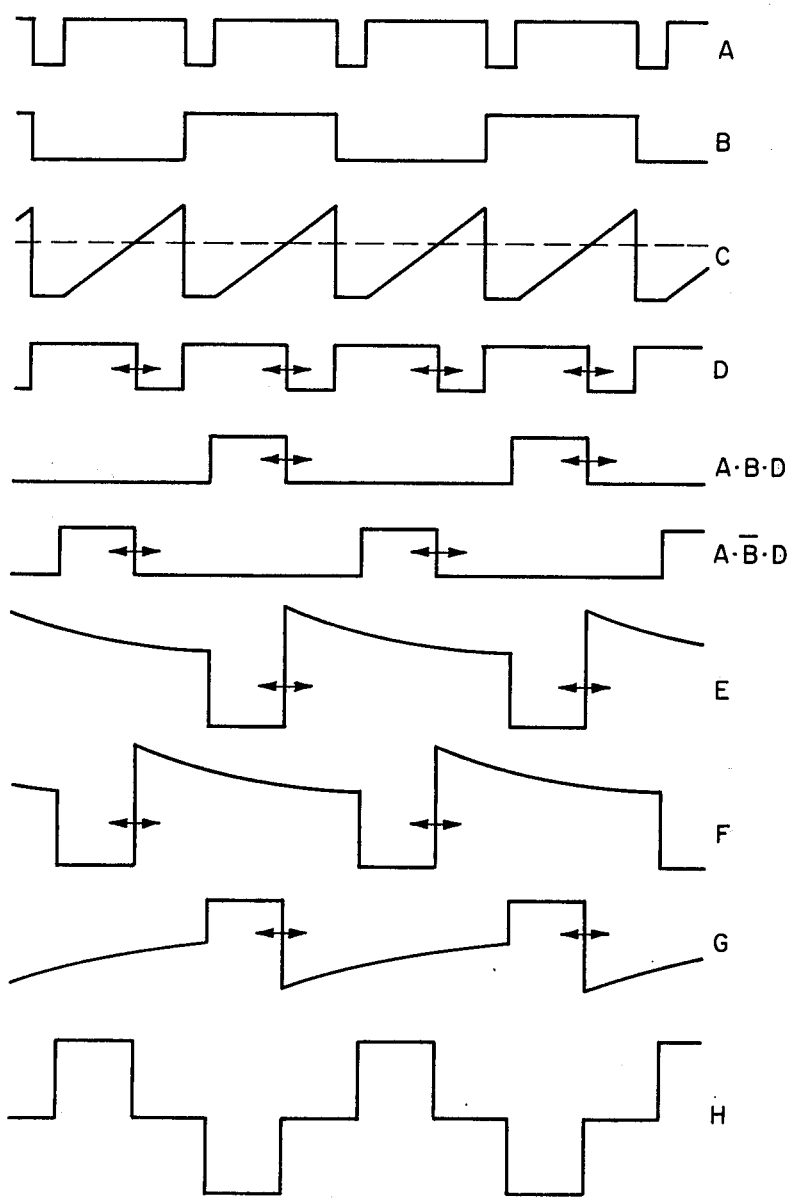
FIG. 3 is a series of waveforms helpful in explaining the operation of the system of FIG. 1.

The conduction periods of each of the inverters 26, 27 and 28 are identical. Thus, the same waveform, H, in FIG. 3, is produced by each of the units. The magnitudes of the voltage and current in any inverter may, however, differ slightly.

In the circuit of FIG. 2, when one transistor is conducting, the full D.C. input voltage, that is one-third the rectified line voltage, appears across one-half of the primary winding of transformer T1. An equal voltage is induced in the opposite half of this primary so that the voltage across the non-conducting transistor is twice the above value. This accounts for the stress of the switching transistors mentioned hereinbefore which necessitates, in some cases, the series arrangement of inverters in the regulator.

It would be pointed out in connection with the operation of the system in FIG. 1 that capacitors 23, 24 and 25 are sufficiently large so that their voltage change during a transistor conduction period is negligible.

Separate transformers and rectifiers are employed with inverters 26, 27 and 28 so that their switching characteristics need not be matched. If transformers T1, T2 and T3 are of similar design, the average output voltage and current of each rectifier, such as 32 and 33, will be the same. If any difference does exist in this portion of the system, it unbalances the input loading of the inverters, forcing the voltages across capacitors 23, 24 and 25 to change. A slightly higher voltage develops on the particular inverter that is delivering the least power. This raises the secondary voltage on the corresponding transformer causing it to deliver a large portion of the load current until the system become balanced.

If the above difference is significant indicating, for example, a failure of one of the components in the circuit of the inverter then the change in the voltage across the different capacitors will be appreciable. An unbalanced current will, therefore, flow through the detectors 29 and 30, closing switch 31 and disabling the inverter chain. By the same token, if any of the inverters malfunction, presenting the appearance of either a short-circuit or an open-circuit, the capacitor voltages likewise quickly unbalance and current again flows through the detectors. Thus, if the drive to inverter 26 is lost and its impedance increases dramatically, capacitor 23 charges toward the fully supply voltage as capacitors 24 and 25 discharge into their inverters. This increases the negative voltage on the right terminal of detector 29, for example, resulting in the flow of an unbalanced current through its coil. In either event mentioned, circuit connecting means 31 is activated and the driving voltage is disconnected from the series of inverters. It would be pointed out that detectors 29 and 30 may be electro-optical couplers of solid state design having no moving parts and a high degree of reliability. Any device capable of detecting a bridge current and providing an isolated output can also serve as either element 29 or 30 in FIG. 1.

The voltages which energize the primary windings of transformers T4 and T5 and control the switching of the transistors in the inverters are derived from oscillator 40 in FIG. 1 which generates waveform A in FIG. 3 having a frequency twice that of the inverter frequency. The duty cycle of this oscillator equals the maximum inverter drive duty cycle. This limitation prevents the simultaneous conduction of any pair of transistors in an inverter which, if it occurred, would virtually short-circuit the D.C. input lines connected thereto causing destructive currents to flow. Oscillator 40 drives a bi-stable flip-flop 41 which produces waveform B and its inverse $\overline{B}$. It also triggers ramp generator 42 whose output is waveform C. The ramp signal serves as one input to comparator 43, the other input which is derived from error amplifier 44. This amplifier serves the complete system and produces an output signal whose amplitude corresponds to the difference in magnitude between a constant reference voltage and a controlled fraction of the voltage then present at the D.C. output terminals 35 and 36. The reference voltage is here developed by a Zener diode 45 which is connected between the negative output terminal 36 and one input terminal of the error amplifier. It is kept conductive in its constant voltage mode by a current flowing from the output terminal through resistor 39. The other input to this amplifier is the voltage occurring at terminal 35, divided by resistors 48 and 49, which may fluctuate or vary in accordance with load conditions or other factors.

One output of flip-flop 41, waveform B, is fed to a NAND gate 46, while the other output of this flip-flop, waveform $\overline{B}$, is fed to one input of a second NAND gate 47. Each of these gates has a second input obtained from oscillator 40 and a third input which is the output of comparator 43, waveform D. The output of NAND gate 46 provides the energizing signal for primary winding T4P of transformer T4, while that of NAND gate 47 serves the same function for transformer T5. Circuit interrupt means is in a fourth input line of these gates and when activated, effectively prevents this energization.

In the operation of this portion of the system whenever the ramp signal is less than the output of error amplifier 44, represented by the broken line on waveform C in FIG. 3, the comparator output is high. At all other times, it is low as illustrated in waveform D. Consequently, waveform D has a variable duty cycle that is a function of the error amplifier output level. Whenever the D.C. output voltage appearing across terminals 35 and 36 increases above its proper level as established by the reference voltage maintained at the input terminal of error amplifier 44 by diode 45, amplifier 44 produces a lower output and the ramp signal remains higher than this new level for longer periods of time in each cycle. The duty cycle of waveform D is, thus, reduced and pulsed waveforms A·B·D and A·$\overline{B}$·D are correspondingly shortened. This shortening is reflected in waveforms E and F which energize the primary windings T4P and T5P and the switching voltage waveform G which represents, in this case, the voltage across T5S1. As a result, the transistors in each inverter are switched "on" for shorter periods of time in each cycle, and this lowers the power supply output voltage back to its proper level. The output waveform for the primary winding of transformer T1 is shown by waveform H.

If the D.C. output voltage at terminals 35 and 36 decreases below its proper level, the duty cycle of waveform D is increased, the inverters are switched "on" for longer periods in each cycle and the output voltage is restored to its correct value.

It would be pointed out that transformers T4 and T5 are of similar construction, each having a primary T4P and T5P, respectively, and three secondaries T4S1, T4S2 and T4S3 and T5S1, T5S2 and T5S3. Thus, there is a secondary winding for each inverter.

In the arrangement of FIG. 1, the A.C. voltages occurring at the secondaries of transformers T1, T2 and T3 are rectified and combined to feed a load connected across terminals 35 and 36. However, the system can function as a static frequency converter without the rectification operation. In this regard, it should be appreciated that the output frequency would be essentially determined by oscillator 40, and the output waveform would correspond to waveform H in FIG. 3.

If the system of FIG. 1 with only two inverters 26 and 27 is used to feed a single phase load, the two secondary windings of transformers T1 and T2 may be interconnected through an interphase transformer. Such a transformer would allow their outputs to be combined and would isolate the switching effects of the two inverters.

If two inverters are used in the system of FIG. 1 and they are driven in quadrature, the A.C. output from the transformer secondaries T1 and T2 may be used to drive a balanced two-phase A.C. load directly. Likewise with three inverters connected in series, as is the case in FIG. 1, and with these inverters operating in a 120° phase sequence, the output transformer secondaries of T1, T2 and T3 may be "Y" connected to drive a balanced three-phase load. This load preferentially should be Delta connected to take advantage of the inherent harmonic reduction and balancing effect. If the polyphase load becomes unbalanced, the detectors would respond to this condition and provide the protection needed to prevent damage to the inverters.

In the arrangement of FIG. 1, the unbalanced current operated circuit interrupt means is located in that portion of the system which produces the switching waveform that is responsible for rendering the transistors sequentially conducting to produce the A.C. waveform. However, it should be appreciated that, if desired, one or more similar switches can be located in the conductors which supply the D.C. driving voltage to the series of inverters so as to isolate the various transistors from their operating potentials.

What is claimed is:

1. In an A.C.-to-D.C. regulated power supply of the type utilizing inverters in its operation, the combination of
   the source of A.C. voltage;
   means for rectifying said A.C. voltage so as to develop a D.C. voltage of a predetermined magnitude across a pair of lines;
   a pair of inverters having their inputs connected in series across said lines;
   a pair of equal resistors connected in series across said lines;
   a pair of equal capacitors connected in series across said lines;
   means for connecting the junction between said capacitors to the junction between said inverters such that the input impedance of an inverter is effectively across a capacitor;
   a current operated circuit disconnect means connected between the junctions of said resistors and said capacitors; and
   means responsive to a current flow of a predetermined magnitude through said disconnect means for rendering said pair of inverters inoperative.

2. In a power supply, the combination of
   a source of D.C. driving voltage;
   a pair of inverters connected in series across said D.C. driving source;
   means for rectifying the outputs of said inverters and for supplying the resultant D.C. voltage to a common load;
   means for maintaining an equal sharing of said D.C. driving voltage source by said inverters while said resultant D.C. voltage is being supplied to said common load; and
   means responsive to a change in the impedance of any one of said inverters by a predetermined amount for rendering said inverters inoperative,
   said last-mentioned means including
      a bridge circuit having one pair of corners connected across said D.C. voltage source,
         said bridge circuit having equal magnitude capacitors in two arms thereof which are in series between said corners,
         means connecting each of said capacitors across a different input circuit of an inverter, and
         a current operated circuit interrupting means included in the control circuit of said inverters and operated by the unbalanced current flowing between another pair of corners of said bridge.

3. In an arrangement as defined in claim 2 wherein said inverters include a pair of solid state devices which are controlled by a switching voltage which renders said devices alternately conducting to form the A.C. waveform and wherein said inverters are rendered inoperative by said interrupting means preventing the application of said switching voltage to said devices.

4. In a power supply, the combination of
   a source of D.C. driving voltage;
   a pair of inverters connected in series across said D.C. driving source;
   means for rectifying the outputs of said inverters and for supplying the resultant D.C. voltage to a common load;
   means for maintaining an equal sharing of said D.C. driving voltage source by said inverters while said resultant D.C. voltage is being supplied to said common load; and
   means responsive to a change in the impedance of any one of said inverters by a predetermined amount for rendering said inverters inoperative,
   said last mentioned means including
      a capacitor connected across the input circuit of each inverter and adapted to be charged to a particular voltage level during the normal operation of the inverter; and
      means operative whenever the voltage across either one of said capacitors changes by a predetermined amount for causing said rendering means to become effective.

* * * * *